(12) United States Patent
Striker et al.

(10) Patent No.: US 11,955,671 B2
(45) Date of Patent: *Apr. 9, 2024

(54) SOLID OXIDE FUEL CELL STACK HAVING A BARRIER LAYER FOR LIMITING CHEMICAL REACTIONS AND ASSOCIATED METHOD THEREOF

(71) Applicant: Cummins Enterprise LLC, Indianapolis, IN (US)

(72) Inventors: Todd Michael Striker, Ballston Lake, NY (US); Matthew Joseph Alinger, Albany, NY (US); Simon William Gaunt, Altamont, NY (US); Nicole Virginia Gonyeau, Albany, NY (US)

(73) Assignee: Cummins Enterprise LLC, Indianapolis, IN (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/407,706

(22) Filed: Aug. 20, 2021

(65) Prior Publication Data

US 2022/0052354 A1 Feb. 17, 2022

Related U.S. Application Data

(62) Division of application No. 15/863,995, filed on Jan. 8, 2018, now Pat. No. 11,121,382.

(51) Int. Cl.
*H01M 8/0228* (2016.01)
*C23C 4/12* (2016.01)
(Continued)

(52) U.S. Cl.
CPC ............. *H01M 8/0228* (2013.01); *C23C 4/12* (2013.01); *H01M 8/0206* (2013.01);
(Continued)

(58) Field of Classification Search
CPC ............. H01M 8/0271; H01M 8/0286; H01M 8/0273; H01M 8/1246; H01M 8/2425; H01M 2008/1293; C03C 27/04
See application file for complete search history.

(56) References Cited

U.S. PATENT DOCUMENTS

| | | | |
|---|---|---|---|
| 3,885,978 A | * 5/1975 | Doi | ............ C04B 28/34 106/690 |
| 6,569,269 B1 | 5/2003 | Fujita | |

(Continued)

FOREIGN PATENT DOCUMENTS

| | | |
|---|---|---|
| CN | 102723448 B | 6/2015 |
| CN | 104505527 B | 8/2016 |

(Continued)

OTHER PUBLICATIONS

Chen et al., "Study on aluminum phosphate binder and related Al2O3-SiC ceramic coating," Materials Science and Engineering A348 (2003) 29-35 (Year: 2003).*

(Continued)

*Primary Examiner* — Amanda J Barrow
(74) *Attorney, Agent, or Firm* — Barnes & Thornburg LLP

(57) ABSTRACT

An solid oxide fuel cell stack having a metallic layer and a glass layer, and a method for preventing or reducing a chemical reaction between a metallic layer and a glass layer are disclosed. The solid oxide fuel cell stack has a barrier layer disposed between the metallic layer and the glass layer. The barrier layer includes alumina and a phosphate. The phosphate includes an aluminum dihydrogen phosphate, an aluminum-containing phosphate, a phosphate of an element of the metallic layer, a phosphate of an element of the glass (Continued)

650

Stacking at least two adjacent solid oxide fuel cells, each solid oxide fuel cell of the at least two adjacent solid oxide fuel cells supported on a metallic interconnect and including an anode, a cathode, and an electrolyte — 652

Disposing a glass seal between the electrolyte of the at least one solid oxide fuel cell of the at least two adjacent solid oxide fuel cells and the metallic interconnect supporting the adjacent solid oxide fuel cell — 654

Disposing a barrier layer including alumina and aluminum dihydrogen phosphate between the metallic interconnect and the glass seal — 656 layer, or combinations thereof. The method includes disposing a barrier layer between the metallic layer and the glass layer.

20 Claims, 5 Drawing Sheets

(51) Int. Cl.
| | |
|---|---|
| *H01M 8/0206* | (2016.01) |
| *H01M 8/0271* | (2016.01) |
| *H01M 8/0273* | (2016.01) |
| *H01M 8/0282* | (2016.01) |
| *H01M 8/1246* | (2016.01) |
| *H01M 8/2425* | (2016.01) |
| *H01M 8/12* | (2016.01) |

(52) U.S. Cl.
CPC ....... *H01M 8/0271* (2013.01); *H01M 8/0273* (2013.01); *H01M 8/0282* (2013.01); *H01M 8/1246* (2013.01); *H01M 8/2425* (2013.01); *H01M 2008/1293* (2013.01)

(56) References Cited

U.S. PATENT DOCUMENTS

| | | | |
|---|---|---|---|
| 7,150,931 | B1 | 12/2006 | Jaffrey |
| 7,314,674 | B2 * | 1/2008 | Hazel ..................... C23C 30/00 |
| | | | 416/241 B |
| 8,691,467 | B2 | 4/2014 | Chatterjee |
| 8,802,324 | B2 | 8/2014 | Lee |
| 9,583,771 | B2 | 2/2017 | Parihar |
| 11,121,382 | B2 * | 9/2021 | Striker ................ H01M 8/1246 |
| 2004/0060967 | A1 | 4/2004 | Yang |
| 2005/0153188 | A1 | 7/2005 | Schenk |
| 2007/0206263 | A1 | 9/2007 | Neuman |
| 2010/0119917 | A1 | 5/2010 | Kumar |
| 2010/0183813 | A1 | 7/2010 | Sambasivan |
| 2010/0255397 | A1 | 10/2010 | Ishikawa |
| 2014/0342267 | A1 * | 11/2014 | Parihar ............... H01M 8/2432 |
| | | | 429/465 |
| 2015/0147621 | A1 | 5/2015 | Striker |
| 2019/0379076 | A1 * | 12/2019 | Wuillemin .......... H01M 8/0276 |

FOREIGN PATENT DOCUMENTS

| | | |
|---|---|---|
| EP | 2104172 A1 | 9/2009 |
| JP | S5234580 A | 3/1977 |
| JP | 2007012549 A | 1/2007 |
| JP | 2009123593 A | 6/2009 |

OTHER PUBLICATIONS

Extended European Search Report and Opinion issued in connection with corresponding EP Application No. 18215352.8 dated Jan. 4, 2019.

Chockalingam et al., "Alumina/cerium oxide nano-composite electrolyte for solid oxide fuel cell applications," Journal of European Ceramic Society, vol. 28, Issue: 5, 2008, pp. 959-963.

Lemes-Rachadel et al., "Development of Alternative Glass Ceramic Seal for a Planar Solid Oxide Fuel Cell," Advances in Materials Science and Engineering, Research Article, vol. 2012, Article ID 346280, 6 pages.

Chen et al., "Clad metals, roll bonding and their applications for SOFC interconnects," Journal of Power Sources 152 (2005), pp. 40-45.

S.E. Grover et al., "Low-Temperature Synthesis of Berlinite-Bonded Alumina Ceramics.", Proceedings of the 1999 American Ceramic Society Annual Meeting, Indianapolis, Apr. 25-28, 1999.

* cited by examiner

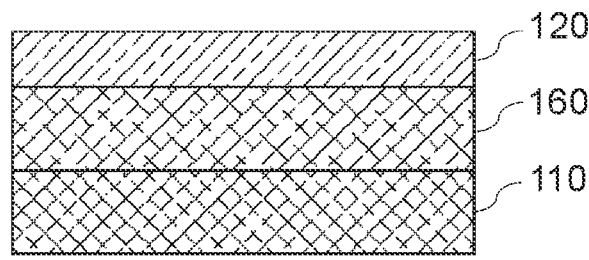

```
Disposing a barrier layer having
alumina and aluminum dihydrogen        210
phosphate between a metallic layer
and a glass layer
```

```
Heating the disposed barrier layer to a
temperature greater than 300°C to form an   220
intermediate barrier layer
```

```
Heating the metallic layer, the glass layer, and
the intermediate barrier layer to a temperature   230
greater than 500°C to form a reacted barrier
layer
```

```
┌─────────────────────────────────────────────┐
│ Stacking at least two adjacent solid oxide fuel │
│ cells, each solid oxide fuel cell of the at least two │──── 652
│ adjacent solid oxide fuel cells supported on a │
│ metallic interconnect and including an anode, a │
│ cathode, and an electrolyte │
└─────────────────────────────────────────────┘
                    ↓
┌─────────────────────────────────────────────┐
│ Disposing a glass seal between the electrolyte of │
│ the at least one solid oxide fuel cell of the at least │──── 654
│ two adjacent solid oxide fuel cells and the metallic │
│ interconnect supporting the adjacent solid oxide │
│ fuel cell │
└─────────────────────────────────────────────┘
                    ↓
┌─────────────────────────────────────────────┐
│ Disposing a barrier layer including alumina and │
│ aluminum dihydrogen phosphate between the │──── 656
│ metallic interconnect and the glass seal │
└─────────────────────────────────────────────┘
```

FIG.6

SOLID OXIDE FUEL CELL STACK HAVING A BARRIER LAYER FOR LIMITING CHEMICAL REACTIONS AND ASSOCIATED METHOD THEREOF

CROSS REFERENCE TO RELATED APPLICATIONS

This application is a divisional application of U.S. application Ser. No. 15/863,995, filed on Jan. 8, 2018, the entire disclosure of which is expressly incorporated herein by reference.

BACKGROUND

Embodiments of the disclosure generally relate to an article having a barrier layer and an associated method. More particularly, embodiments of the disclosure relate to an article having a barrier layer between a metallic layer and a glass layer, and a method for preventing or reducing a chemical reaction between the metallic layer and the glass layer by disposing the barrier layer.

Electrochemical cells convert chemical energy into electrical energy. Electrochemical cells such as solid oxide fuel cells (SOFCs) convert chemical energy into electrical energy with high efficiency and low emissions. In the SOFC, a cathode reduces oxygen on one side and supplies the oxygen ions to the electrolyte. A hermetically sealed electrolyte conducts the oxygen ions at high temperature to the anode, where the ions oxidize and react with hydrogen to form water. A resistive load connecting the anode and the cathode conducts electrons to perform work.

Anode-supported SOFCs based on traditional ceramic sintering technology may be limited by the maximum manufacturable cell size and requirement of large capital investment. Metal interconnect-supported SOFCs utilizing thermal spray deposition offer a variety of manufacturing benefits as well as a rugged design. Generally, a glass seal layer is used as a seal between the cathode-side metal interconnect and the electrolyte in a metal interconnect-supported SOFC. However, chemical reactions may occur between the metal interconnect and the glass seal at elevated temperatures resulting in weakening of an interface between the metal interconnect and the glass seal, and the subsequent loss of seal.

Conventional mitigation methods of preventing chemical reaction between the metal interconnect and the glass seal layer utilize a thermal-sprayed yttria stabilized zirconia (YSZ) or alumina coating between the two. However, deposition of intermediate coatings using a thermal spray may involve relatively long cycle time and a high cost involved in preparing the unique powders required for thermal spray. Still another conventional mitigation method utilizes aluminizing the interconnect metal surface such that an aluminum oxide protective scale is formed. However, this process requires additional manufacturing steps and may increase cost. An efficient barrier between the metal interconnect and the glass seal and a method of fabricating that barrier would be beneficial for profitable commercialization of electrochemical cells such as SOFCs.

BRIEF DESCRIPTION

In one aspect, the disclosure relates to an article. The article includes a metallic layer, a glass layer, and a barrier layer disposed between the metallic layer and the glass layer. The barrier layer includes alumina and a phosphate. The phosphate includes an aluminum dihydrogen phosphate, an aluminum-containing phosphate, a phosphate of an element of the metallic layer, a phosphate of an element of the glass layer, or combinations thereof.

In another aspect, the disclosure relates to a solid oxide fuel cell stack. The solid oxide fuel cell stack includes at least two adjacent solid oxide fuel cells. Each solid oxide fuel cell of the stack includes an anode, a cathode, and an electrolyte. A metallic interconnect is disposed between the at least two adjacent solid oxide fuel cells. A glass seal is disposed between the metallic interconnect and the electrolyte of at least one solid oxide fuel cell of the at least two adjacent solid oxide fuel cells. A barrier layer is disposed between the metallic interconnect and the glass seal. The barrier layer includes alumina and a phosphate. The phosphate includes an aluminum dihydrogen phosphate, an aluminum-containing phosphate, a phosphate of an element of the metallic interconnect, a phosphate of an element of the glass seal, or combinations thereof.

In yet another aspect, the disclosure relates to a method of fabricating a solid oxide fuel cell stack. The method includes stacking at least two adjacent solid oxide fuel cells. Each solid oxide fuel cell of the at least two adjacent solid oxide fuel cells is supported on a metallic interconnect and each solid oxide fuel cell of the at least two adjacent solid oxide fuel cells includes an anode, a cathode, and an electrolyte. The method includes disposing a glass seal between the electrolyte of the at least one solid oxide fuel cell of the at least two adjacent solid oxide fuel cells and the metallic interconnect on which the adjacent solid oxide fuel cell of the at least two solid oxide fuel cells is supported. The method further includes disposing a barrier layer including alumina and aluminum dihydrogen phosphate between the metallic interconnect and the glass seal.

BRIEF DESCRIPTION OF THE DRAWINGS

These and other features and aspects of embodiments of the disclosure will become better understood when the following detailed description is read with reference to the accompanying drawings in which like characters represent like parts throughout the drawings, wherein FIG. 1 illustrates a schematic view of an article having a barrier layer between a metallic layer and a glass layer, in accordance with some embodiments of the disclosure;

FIG. 2 illustrates a flow chart of a method for preventing or reducing a chemical reaction between a metallic layer and a glass layer, in accordance with some embodiments of the disclosure;

FIG. 6 illustrates a flowchart of an example method of fabricating a solid oxide fuel cell stack, in accordance with some embodiments of the disclosure;

DETAILED DESCRIPTION

Figure 3A:
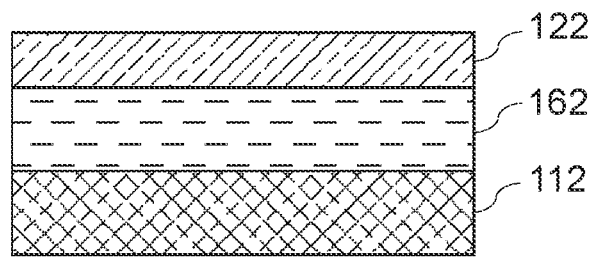
FIG. 3A illustrates a schematic view of an as disposed article, in accordance with some embodiments of the disclosure.

In the following specification and the claims, which follow, reference will be made to a number of terms, which shall be defined to have the following meanings. The singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Here and throughout the specification and claims, range limitations may be combined and/or interchanged, such ranges are identified and include all the sub-ranges contained therein unless context or language indicates otherwise.

The article and method described herein address the noted shortcomings in conventional electrochemical cells having metallic and glass layers and method of limiting the reaction between the metallic layers and the glass layers. In conventional electrochemical cells, the reactions between the metallic layer and the glass layer are limited by chemically altering the surface composition of at least one of the metallic and the glass layer. The method described herein may be particularly useful in preventing or reducing chemical reactions between the metallic layer and the glass layer that may result in undesirable products during operation, though it will be appreciated that this is not a necessary limitation to the scope of the method described herein.

An article having a metallic layer, a glass layer, and a barrier layer disposed between the metallic layer and the glass layer is presented. The article may be any article where reducing a chemical reaction between the metallic layer and the glass layer is desirable. In some embodiments, it may be desirable to limit the reaction between the metallic layer and the glass layer of the article at room temperature. In some embodiments, limiting the reaction between the metallic layer and the glass layer is desired at temperatures at which the article is likely to operate. In some embodiments, this temperature may be higher than room temperature. Non-limiting examples of article include, but are not limited to, various electrochemical cells, including a solid oxide fuel cell (SOFC).

FIG. 1 schematically illustrates an article 100 that includes a metallic layer 110, glass layer 120, and a barrier layer 160 disposed between the metallic layer 110 and the glass layer 120. The metallic layer 110 may be a metallic film or a solid metallic object having a surface that may contact the glass layer 120 during operation of the article 100. The metallic layer 110 may be a continuous layer or may be discontinuous at some points. As used herein, the "metallic" layer denotes the presence of a metallic or metalloid element in the metallic layer 110. Non-limiting examples of the elements that may be present in the metallic layer 110 includes chromium, iron, silicon, titanium, nickel, or combinations thereof. The metallic layer 110 may include an elemental metal, a metalloid, an alloy, a ceramic, or a composite that includes a metallic or metalloid element. Further, the metallic layer 110 may include a single material or may be a combination of two or more materials. In some embodiments, the metallic layer 110 includes an alloy. In some specific embodiments, the metallic layer 110 is a continuous layer including an alloy.

The glass layer 120 may be a continuous or discontinuous layer of one or more glassy materials. A glassy material may be a non-crystalline, amorphous solid at room temperature. Non-limiting examples of elements that may be present in the glass layer 120 include barium, silicon, boron, zirconium, calcium, magnesium, yttrium, zinc, or combinations thereof. In some embodiments, the glass layer 120 includes boron. Also, in some embodiments, the glass layer 120 includes silicon. Further, in some embodiments, the glass layer 120 is a continuous layer including a glassy material that includes silica, boron, and barium.

The barrier layer 160 includes alumina and a phosphate. The alumina and the phosphate of the barrier layer 160 may prevent a chemical reaction or reduce the possibility of a chemical reaction between an element of the metallic layer 110 and an element of the glass layer 120. The phosphate of the barrier layer 160 includes an aluminum dihydrogen phosphate, an aluminum-containing phosphate, a phosphate of an element of the metallic layer 110, a phosphate of an element of the glass layer 120, or combinations thereof. As used herein, an "aluminum-containing phosphate" refers to an aluminum phosphate, aluminum meta phosphate, or a combination thereof. In some embodiments, the barrier layer 160 includes the alumina and the phosphate in a mixture form.

An amount of the phosphate in the barrier layer 160 may be varied based on one or more of: the composition of the metallic layer 110, the composition of the glass layer 120, the phosphate composition itself, and the temperature of operation of the article 100. In some embodiments, an amount of the phosphate in the barrier layer 160 is in a range from about 1 mol % to about 75 mol % of the barrier layer 160. In some embodiments, the barrier layer 160 includes the phosphate in an amount from about 3 mol % to about 45 mol % of the barrier layer 160. In some other embodiments, the barrier layer 160 includes the phosphate in an amount from about 30 mol % to about 60 mol % of the barrier layer 160. In some embodiments, the phosphate of the barrier layer 160 includes aluminum dihydrogen phosphate. In these embodiments, the barrier layer 160 may be in an as-disposed state or in a dried state. The aluminum dihydrogen phosphate may be present in the barrier layer 160 in an amount in a range from about 1 mol % to about 45 mol % of the barrier layer 160. In certain embodiments, the aluminum dihydrogen phosphate may be present in the barrier layer 160 in an amount in a range from about 3 mol % to about 30 mol % of the barrier layer 160. In some embodiments, the phosphate of the barrier layer 160 includes an aluminum-containing phosphate, an aluminum phosphate hydrate, or a combination thereof. In some embodiments, the aluminum-containing phosphate may be formed in the barrier layer 160 by the decomposition and dehydration of aluminum dihydrogen phosphate. Moreover, in some embodiments, the aluminum-containing phosphate may be present in the barrier layer 160 in an amount in a range from about 3 mol % to about 60 mol % of the barrier layer 160. In certain embodiments, an amount of aluminum meta-phosphate in the barrier layer 160 is in a range from about 10 mol % to about 45 mol % of the barrier layer 160. Further, in some embodiments, the barrier layer 160 includes a combination of alumina, the aluminum dihydrogen phosphate, and the meta-aluminum phosphate.

In some embodiments, the phosphate of an element of the metallic layer 110 includes a chromium phosphate, an iron phosphate, a silicon phosphate, a manganese phosphate, a titanium phosphate, a nickel phosphate, or combinations thereof. Also, in some embodiments, the phosphate of the element of the metallic layer 110 may be present in the barrier layer 160 in an amount in a range from about 3 mol % to about 60 mol % of the barrier layer 160. In certain embodiments, an amount of phosphate of the element of the metallic layer 110 in the barrier layer 160 is in a range from about 10 mol % to about 45 mol % of the barrier layer 160.

Additionally, in some embodiments, the phosphate of an element of the glass layer 120 includes a barium phosphate, a silicon phosphate, a boron phosphate, a zirconium phosphate, a calcium phosphate, a magnesium phosphate, an yttrium phosphate, a zinc phosphate, or combinations thereof. In some embodiments, the phosphate of the element of the glass layer 120 may be present in the barrier layer 160 in an amount in a range from about 3 mol % to about 60 mol % of the barrier layer 160. In certain embodiments, an amount of phosphate of the element of the glass layer 120 in the barrier layer 160 is in a range from about 10 mol % to about 45 mol % of the barrier layer 160.

Furthermore, in certain embodiments, the barrier layer 160 includes alumina, the phosphate of an element of the metallic layer 110, and the phosphate of an element of the glass layer 120. In some embodiments, the barrier layer 160 further includes aluminum meta-phosphate. The composition of the phosphate present in the barrier layer 160 may be varied based on the method of fabricating the article 100 and various operating conditions of the article 100. Depending on the method of fabrication, the barrier layer 160 may be in the form of an as disposed barrier layer, an intermediate barrier layer, or a reacted barrier layer, as further illustrated with the help of FIGS. 2 and 3.

A method for preventing or reducing a chemical reaction between a metallic layer and glass layer of an article is disclosed in FIG. 2. The method includes disposing a barrier layer between the metallic layer and the glass layer. The disposed barrier layer includes alumina and aluminum dihydrogen phosphate. FIG. 2 illustrates a flowchart of an example method 200 for preventing or reducing a chemical reaction between the metallic layer 110 and the glass layer 120 of the article 100 of FIG. 1, according to some embodiments.

In some embodiments, the method 200 includes disposing a barrier layer between the metallic layer 110 and the glass layer 120 at step 210 to form a disposed barrier layer 160 (see FIG. 1). The disposed barrier layer 160 includes alumina and aluminum dihydrogen phosphate. In some embodiments, an amount of aluminum dihydrogen phosphate present in the disposed barrier layer 160 is in a range from about 1 mol % to about 45 mol % of the disposed barrier layer 160. In certain embodiments, the disposed barrier layer 160 includes aluminum dihydrogen phosphate in an amount from about 3 mol % to about 30 mol % of the disposed barrier layer 160. In some embodiments, the disposed barrier layer 160 may include water, a solvent, or combination thereof, along with the alumina and the aluminum dihydrogen phosphate. In certain other embodiments, alumina may be present in the disposed barrier layer 160 in an amount from about 65 mol % to about 99 mol % of the disposed barrier layer 160. In certain embodiments, the disposed barrier layer 160 includes alumina in an amount from about 70 mol % to about 97 mol % of the disposed barrier layer 160. In some embodiments, the alumina present in the disposed barrier layer 160 is alpha-alumina ($\alpha$-$Al_2O_3$).

At step 220, the disposed barrier layer 160 is heated to a temperature greater than 300° C. to dehydrate, and at least partially react the aluminum dihydrogen phosphate and alumina to form an intermediate barrier layer. In some embodiments, the temperature used for heating at step 220 may be in a range from about 300° C. to about 500° C. In certain embodiments, at step 220, the disposed barrier layer 160 is heated to a temperature in a range from about 300° C. to about 400° C. to form the intermediate barrier layer. The intermediate barrier layer includes an aluminum-containing phosphate. In some embodiments, the aluminum dihydrogen phosphate may decompose before reacting with alumina to form aluminum meta-phosphate. Depending on the ratio of the aluminum dihydrogen phosphate to alumina present in the disposed barrier layer 160, temperature of heating, and an extent of reaction of the aluminum dihydrogen phosphate with the alumina of the disposed barrier layer 160 during the heating step 220, the intermediate barrier layer may include both the aluminum dihydrogen phosphate and the aluminum meta-phosphate along with alumina. In some embodiments, entire amount of the aluminum dihydrogen phosphate may react with alumina, at step 220, to form aluminum-containing phosphate in the intermediate barrier layer. In these embodiments, 3 moles of aluminum phosphate may be formed per mole of aluminum dihydrogen phosphate reacted with a mole of alumina, as per the reaction (I):

$$Al(H_2PO_4)_3 + Al_2O_3 \rightarrow 3AlPO_4 + 3H_2O \quad (I)$$

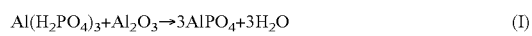

In some embodiments, an amount of aluminum-containing phosphate present in the intermediate barrier layer may be in a range from about 3 mol % to about 75 mol % of the intermediate barrier layer. The heating of the disposed barrier layer 160 at the step 220 may be carried out separately, or in some embodiments, the metallic layer 110 and the glass layer 120 may be heated along with the disposed barrier layer 160. Example methods of heating include, but are not limited to, convection heating, resistive heating, inductive heating, microwave heating, or any combinations thereof. In some embodiments, the disposed barrier layer 160 is heated in-situ during operation of the article 100. In some embodiments, the metallic layer 110 includes a metallic interconnect of an electrochemical cell and the glass layer 120 includes a glass seal of the electrochemical cell. In these embodiments, the disposed barrier layer may be heated in-situ during the operation of an SOFC cell in a SOFC stack.

At step 230, the method 200 includes heating the metallic layer 110, the glass layer 120, and the intermediate barrier layer to a temperature greater than 500° C. to form a reacted barrier layer. In some embodiments, the temperature used for heating at step 230 may be in a range from about 520° C. to about 800° C. In certain embodiments, at step 230, the intermediate barrier layer is heated to a temperature in a range from about 550° C. to about 800° C. Heating methods for step 230 may be similar or different from those described for heating at step 220. By heating to a temperature greater than 500° C., the phosphate at least partially reacts with at least an element of the metallic layer 110 and at least an element of the glass layer 120. In some embodiments, the reacted barrier layer includes alumina, a phosphate of an element of the metallic layer 110, and a phosphate of an element of the glass layer 120. As used herein, "a phosphate of an element of the metallic layer" refers to one or more phosphate compounds having one or more elements of the metallic layer 110. Further, "a phosphate of an element of the glass layer" refers to one or more phosphate compounds having one or more elements of the glass layer 120. In some embodiments, the reacted barrier layer includes alumina, aluminum meta-phosphate, a phosphate of an element of the metallic layer 110, and a phosphate of an element of the glass layer 120. In some embodiments, a combined amount of a phosphate of an element of the metallic layer 110 and a phosphate of an element of the glass layer 120 present in the reacted barrier layer is in a range from about 3 mol % to about 75 mol % of the reacted barrier layer. In some embodiments, an amount of aluminum-containing phosphate in the reacted barrier layer is in a range from about 3 mol % to 60 mol % of the reacted barrier layer. In these embodiments, alumina may be in an amount from about 40 mol % to about 97 mol % of the reacted barrier layer.

FIG. 3 is a diagrammatical illustration of the various stages of the article 100 (see FIG. 1) formed using steps of the method 200 of FIG. 2. In some embodiments, an article 102 is in an initial, "as disposed" stage, as illustrated in FIG. 3A. The as disposed article 102 shown in FIG. 3A includes a metallic layer 112, a glass layer 122, and an as disposed barrier layer 162 positioned between the metallic layer 112 and the glass layer 122. In some embodiments, the as deposited barrier layer 162 includes alumina and aluminum dihydrogen phosphate.

Figure 3B:
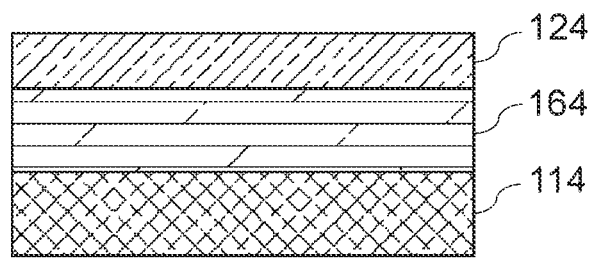
FIG. 3B illustrates a schematic view of an intermediate article, in accordance with some embodiments of the disclosure.

In some embodiments, an article 104 is in an intermediate stage, as illustrated in FIG. 3B. The intermediate article 104 shown in FIG. 3B is formed after heating the as disposed article 102 of FIG. 3A to a temperature greater than 300° C. The intermediate article 104 includes a metallic layer 114, a glass layer 124, and an intermediate barrier layer 164 positioned between the metallic layer 114 and the glass layer 124. In some embodiments, the intermediate barrier layer 164 includes an aluminum-containing phosphate. In certain embodiments, the intermediate barrier layer 164 includes alumina and aluminum phosphate. The metallic layer 114 and the glass layer 124 may have compositions same as or different from the composition of the metallic layer 112 and the glass layer 122 respectively, of the as disposed article 102.

Figure 3C:
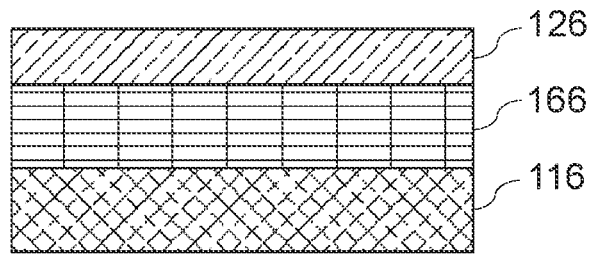
FIG. 3C illustrates a schematic view of a reacted article, in accordance with some embodiments of the disclosure.

Furthermore, in some embodiments, an article 106 is in a reacted stage, as illustrated in FIG. 3C. The reacted article 106, shown in FIG. 3C is formed after heating the intermediate article 104 to a temperature greater than 500° C. The reacted article 106 includes a metallic layer 116, a glass layer 126, and a reacted barrier layer 166 positioned between the metallic layer 116 and the glass layer 126. In some embodiments, the reacted barrier layer 166 includes alumina, a phosphate of an element of the metallic layer 116, and a phosphate of an element of the glass layer 126. Additionally, in some embodiments, the reacted barrier layer 166 further includes an aluminum-containing phosphate. In some embodiments, the metallic layer 116 has the same composition as the composition of the metallic layer 112 of the as disposed article 102 and the metallic layer 114 of the intermediate article 104. Also, in some embodiments, the metallic layer 116 of the reacted article 106 has a composition that is slightly different from the composition of the metallic layer 112 of the as disposed article 102, the metallic layer 114 of the intermediate article 104, or both. In some embodiments, the slight variation of the composition of the metallic layer 116 may be a result of depletion of one or more elements of the metallic layer 114 to react with the alumina or aluminum-containing phosphate of the intermediate barrier layer 164 of the intermediate article 104. In some embodiments, the glass layer 126 has the same composition as that of the glass layer 122 of the as disposed article 102 and the glass layer 124 of the intermediate article 104. Further, in some embodiments, a composition of the glass layer 126 may have a varied composition from that of the composition of the glass layer 124 of the intermediate article 104, due to depletion of one or more elements of the glass layer 124 during reaction with the intermediate barrier layer 164.

Therefore, referring again to FIG. 1, the barrier layer 160 of FIG. 1, may refer to the as disposed barrier layer 162, the intermediate barrier layer 164, or the reacted barrier layer 166 of FIG. 3. In some embodiments, the barrier layer 160 is the reacted barrier layer 166 that includes alumina, aluminum phosphate, a phosphate of an element of the metallic layer 110, and a phosphate of an element of the glass layer 120.

Figure 4:
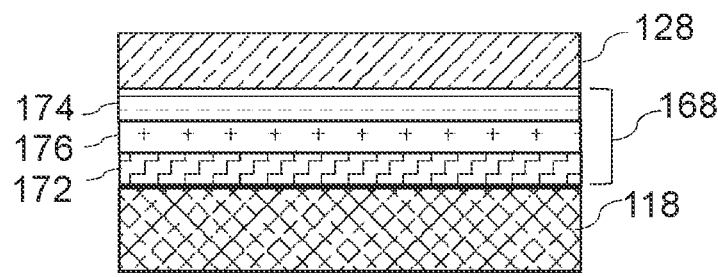
FIG. 4 illustrates a schematic view of an article having a barrier layer with sublayers, in accordance with some embodiments of the disclosure.

In some embodiments, the barrier layer 160 may include a plurality of sublayers. Turning now to FIG. 4, an article 108 is disclosed. In some embodiments, the article 108 may be the reacted article 106 illustrated in FIG. 3C. The article 108 has a metallic layer 118 and a glass layer 128. A barrier layer 168 is disposed between the metallic layer 118 and the glass layer 128. In the example of FIG. 4, the barrier layer 168 includes a first sublayer 172, a second sublayer 174, and a third sublayer 176 disposed between the first sublayer 172 and the second sublayer 174. The first sublayer 172 includes the phosphate of an element of the metallic layer 118. The second sublayer 174 includes the phosphate of an element of the glass layer 128, and the third sublayer 176 includes alumina and an aluminum-containing phosphate.

In some embodiments, the first sublayer 172 includes a chromium phosphate, an iron phosphate, a silicon phosphate, a manganese phosphate, a titanium phosphate, or combinations thereof. In other embodiments, the first sublayer 172 further includes alumina along with the phosphate of an element of the metallic layer 118. In some embodiments, the second sublayer 174 includes a barium phosphate, a silicon phosphate, a boron phosphate, a zirconium phosphate, a calcium phosphate, a magnesium phosphate, an yttrium phosphate, a zinc phosphate, or any combinations thereof. Further, in certain embodiments, the second sublayer 174 further includes alumina along with the phosphate of an element of the glass layer 128. In some embodiments, the third sublayer 176 includes alumina and aluminum meta-phosphate. Also, in some embodiments, the third sublayer 176 may be substantially free of an element of the metallic layer 118 or an element of the glass layer 128. The third sublayer 176 is considered to be substantially free of an element of the metallic layer 118 or an element of the glass layer 128, if a combined amount of the element of the metallic layer 118 and the element of the glass layer 128 in the third sublayer 176 is less than 2 mol % of the third sublayer 176.

Moreover, in some embodiments, the first sublayer 172, the second sublayer 174, and the third sublayer 176 may be designed such that a mol % of the phosphate of an element of the metallic layer 118 present in the first sublayer 172 is greater than a mol % of the aluminum-containing phosphate present in the third sublayer 176. Further, in some such embodiments, a mol % of alumina present in the first sublayer 172 is less than a mol % of alumina present in the third sublayer 176. Additionally, in some embodiments, the first sublayer 172, the second sublayer 174, and the third sublayer 176 may be designed such that a mol % of the phosphate of an element of the glass layer 128 present in the second sublayer 174 is greater than a mol % of the aluminum-containing phosphate present in the third sublayer 176. Further, in some such embodiments, a mol % of alumina present in the second sublayer 174 is less than a mol % of alumina present in the third sublayer 176.

Further, in certain embodiments, a mol % of alumina present in the third sublayer 176 is greater than a mol % of aluminum-containing phosphate present in the third sublayer 176. A higher mol % of alumina than a mol % of aluminum-containing phosphate in the third sublayer 176 is desirable to limit chemical reaction between the first sublayer 172 and the second sublayer 174 after the article 108 has been subjected to the operating conditions for a certain duration of time. Further, a thicker third sublayer 176 may be desirable to limit the chemical reaction between the first sublayer 172 and the second sublayer 174. In some embodiments, a thickness of the third sublayer 176 is greater than 5 microns. Also, in some embodiments, the third sublayer 176 may have a thickness in a range from about 5.5 microns to about 50 microns.

In some articles, such as, for example a conventional SOFC, the metallic layer is normally enriched with aluminum to form alumina during operation of the article and thereby limit reaction with the glass layer. In the embodiments presented in the present disclosure, the barrier layer is designed to prevent or reduce reaction between the metallic layer 110 and the glass layer 120, in the different stages 102, 104, and 106 of the article 100 (FIGS. 3A-3C). Therefore, the need for enriching the metallic layer 112 with aluminum for limiting reaction with the glass layer 122 for preventing or reducing the reaction between the metallic layer 114 and the glass layer 124 in the intermediate article 104 or for preventing or reducing the reaction between the metallic layer 116 and the glass layer 126 in the reacted article 106 is circumvented. Accordingly, in some embodiments, the metallic layer 112 of the as disposed article 102 is substantially free of aluminum. The metallic layer 112 is said to be "substantially free of aluminum" when there is no intentional addition of aluminum to the metallic layer 112 during the manufacture of the metallic layer 112 or during any further processing, for the purpose of any technical advancement during operation of the article 102. In some embodiments, any unintentional addition of aluminum in the metallic layer 112 is less than 0.1 mol % of the metallic layer 112. In some embodiments, the article 102 is a solid oxide fuel cell stack having a metallic interconnect and a glass seal.

Figure 5:
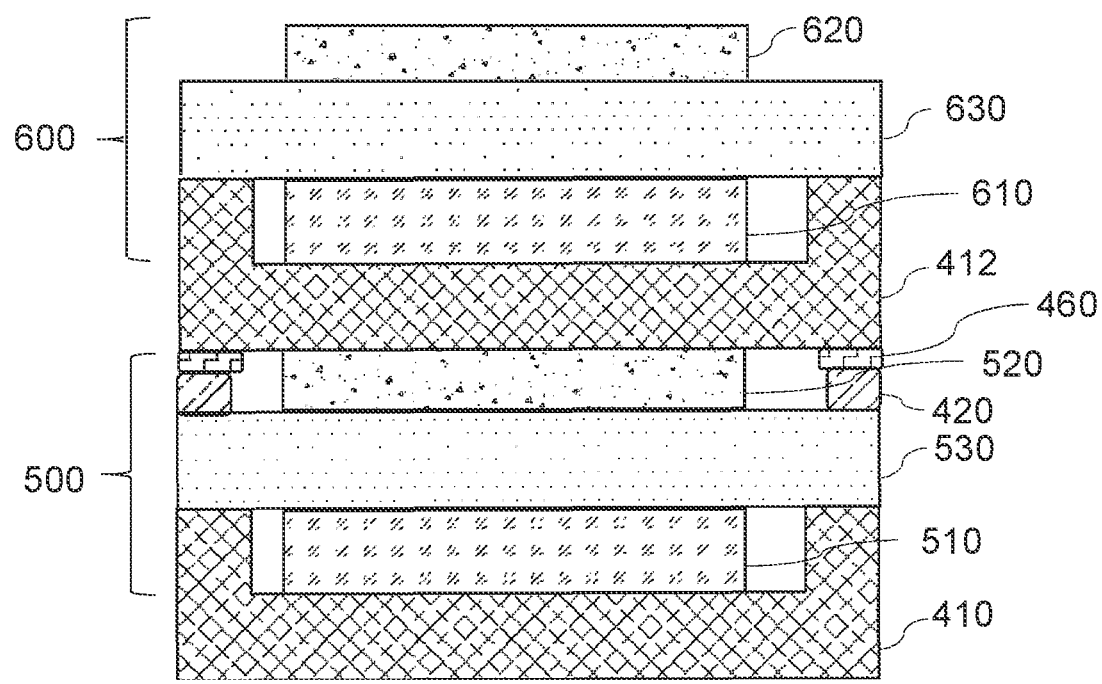
FIG. 5 illustrates a schematic view of a solid oxide fuel cell stack, in accordance with some embodiments of the disclosure.

In addition, in some embodiments, a solid oxide fuel cell (SOFC) stack 400 is presented, as schematically shown in FIG. 5. The solid oxide fuel cell stack 400 illustrated in FIG. 5 is a metallic interconnect supported solid oxide fuel cell stack. The solid oxide fuel cell stack 400 includes at least two adjacent solid oxide fuel cells 500 and 600. Each solid oxide fuel cell 500, 600 of the stack 400 includes an anode 510, 610, a cathode 520, 620, and an electrolyte 530, 630, and is supported on a metallic interconnect 410, 412. In some embodiments, the metallic interconnect 410, 412 includes a ferritic stainless steel. Ferritic stainless steel has proven to be successful as an economic and durable solid oxide fuel cell interconnect material. In some embodiments, the metallic interconnect 410, 412 of the solid oxide fuel cell stack 400 is substantially free of aluminum.

The solid oxide fuel cell stack 400 is sealed using a glass seal 420 disposed between the electrolyte 530 of the solid oxide fuel cell 500 and the metallic interconnect 412 supporting the other adjacent solid oxide fuel cell 600. In some embodiments, a barium-borosilicate based (BaO—$B_2O_3$—$SiO_2$) glass is used as the glass seal 420. The barium-borosilicate glass has shown long-term success as a solid oxide fuel cell sealing material. In embodiments having ferritic stainless steel as the metallic interconnect 410, 412 and the barium-borosilicate glass as the glass seal 420, chemical reactions occur between the glass and the ferritic stainless-steel at elevated temperatures of operation of the solid oxide fuel cell, resulting in devitrification of the glass and formation of interfacial phases, such as barium chromate. Barium chromate formation may result in large voids at the reaction zone, thereby weakening the interface between the metallic interconnect 410, 412 and the glass seal 420.

Thus, in accordance with some embodiments of the disclosure, a barrier layer 460 is disposed between the metallic interconnect 412 and the glass seal 420 to prevent or reduce a reaction between elements of the metallic interconnect 412 and the glass seal 420. The barrier layer 460 includes alumina and a phosphate. The phosphate of the barrier layer 460 includes an aluminum dihydrogen phosphate, an aluminum phosphate, an aluminum meta-phosphate, a phosphate of an element of the metallic interconnect 412, a phosphate of an element of the glass seal 420, or combinations thereof.

In some embodiments, the barrier layer 460 is an as disposed barrier layer 162, having alumina and aluminum dihydrogen phosphate, as shown in FIG. 3A. In certain embodiments, the barrier layer 460 is an intermediate barrier layer 164, having alumina and aluminum-containing phosphate, as shown in FIG. 3B. Additionally, in some embodiments, the barrier layer 460 is a reacted barrier layer 166, having alumina and phosphate of an element of the metallic interconnect 412 and a phosphate of an element of the glass seal 420, as shown in FIG. 3C. In some embodiments, the barrier layer 460 may include a first sublayer of the barrier layer having a phosphate of an element of the metallic interconnect 412, a second sublayer having a phosphate of an element of the glass seal 420, and a third sublayer disposed between the first sublayer and the second sublayer, and having alumina and an aluminum-containing phosphate (not shown in FIG. 5). The terms "disposed barrier layer, "intermediate barrier layer", and "reacted barrier layer" have been previously described with reference to FIGS. 3A-3C.

In some embodiments, the barrier layer 460 is disposed in a non-active region of the metallic interconnect 412 such that an amount of current density passing through the barrier layer 460 during operation of the solid oxide fuel cell stack 400 is negligible. As used herein, a "non-active region" of the interconnect is a region of the metallic interconnect 412 that is not in direct contact with the cathode 520 or the anode 610 of the solid oxide fuel cell stack 400.

In some embodiments, a method of fabricating the solid oxide fuel cell stack is disclosed. FIG. 6 illustrates a flowchart of an example method 650 of fabricating the solid oxide fuel cell stack 400 illustrated in FIG. 5. The method 650 of FIG. 6 is described with reference to the components of the SOFC stack 400 of FIG. 5.

The method 650, at a step 652, includes stacking the at least two adjacent solid oxide fuel cells 500 and 600. Further, at step 654, the method 650 includes disposing a glass seal between the electrolyte 530 of the at least one solid oxide fuel cell 500 of the at least two adjacent solid oxide fuel cells and the metallic interconnect 412 of the adjacent solid oxide fuel cell 600 of the at least two solid oxide fuel cells. Step 656 of the method 650 includes disposing a barrier layer 460 between the metallic interconnect 412 and the glass seal 420.

After the stacking of the at least two adjacent solid oxide fuel cells 500 and 600 at step 652 and before step 654 of disposing the barrier layer 460, in some embodiments, the metallic interconnect 410, 412 may be cleaned and prepared using mechanical methods to remove excess surface oxidation. In certain embodiments, chromium oxide that may be present on the surface of the metallic interconnect 410, 412 is substantially removed before disposing the barrier layer 460.

The barrier layer 460 may be disposed using various methods including, but not limited to, a variety of non-contact methods such as spraying, spray atomization, ultrasonic atomization, dip coating, or combinations thereof. In some embodiments, the barrier layer 460 is applied as a slurry coating on the metallic interconnect 410, 412. In some embodiments, the barrier layer 460 may be disposed using a variety of contact methods such as painting, screen printing, pad printing, or combinations thereof. In certain embodiments, a surfactant is added to the slurry to help in wetting of the applied barrier layer with the metallic interconnect 410, 412. The disposed barrier layer 460 may be dried, heated, reacted with the metallic interconnect 410, 412 and the glass seal 420 and sintered in-situ during heating and operation of the solid oxide fuel cell stack 400.

In some embodiments, the method 650 may further include a step of heating the disposed barrier layer 460 to a temperature greater than 300° C. to at least partially dehydrate and decompose the aluminum dihydrogen phosphate to form an intermediate barrier layer that includes aluminum-containing phosphate. In certain embodiments, the disposed barrier layer 460 may be heated to a temperature in a range from about 300° C. to about 400° C. to at least partially decompose the aluminum dihydrogen phosphate to form the intermediate barrier layer. Furthermore, in some embodiments, the aluminum dihydrogen phosphate of the disposed barrier layer 460 may at least partially react with alumina to form an intermediate barrier layer that includes aluminum phosphate, aluminum meta-phosphate, alumina, or combinations thereof.

On heating, the disposed barrier layer 460 may be converted into an intermediate barrier layer having aluminum-containing phosphate. A reaction of the intermediate barrier layer with the metallic interconnect 410, 412 having stainless steel may include growth of chromium oxide in the steel and reaction of chromium oxide with aluminum-containing phosphate to form chromium phosphate. At least some of other elements present in the metallic interconnect may also react with aluminum-containing phosphate to form respective phosphates of those elements.

During heating, glass of the glass seal 420 may soften or melt around the glass transition temperature, and infiltrate the disposed or intermediate barrier layer sufficiently such that during thermal cycles of operation of the solid oxide fuel cell stack 400, adequate adhesion strength is developed between the adjacent layers of the intermediate barrier layer and the glass seal 420. In addition, reaction phases may be formed between the aluminum-containing phosphate of the intermediate barrier layer and elements of the glass seal 420, such as barium, boron, yttrium, calcium, silicon, zinc, magnesium, for example, thereby strengthening bonding between the barrier layer 460 and the glass seal 420.

In some embodiments, the method 650 may further include a step of heating the metallic interconnect 412, the glass seal 420, and the intermediate barrier layer to a temperature greater than 500° C. to at least partially react the aluminum-containing phosphate with the metallic interconnect 412 and the glass seal 420 to form a reacted barrier layer. Thus, in certain embodiments, the intermediate barrier layer may be heated to a temperature in a range from about 550° C. to about 800° C. In some embodiments, the method may further include fabricating the solid oxide fuel cell 600 supported by the metallic interconnect 412. The method of fabricating the solid oxide fuel cell 600 includes additively manufacturing the anode 610, electrolyte 630, and cathode 620 on the metallic interconnect 412.

Figure 7:
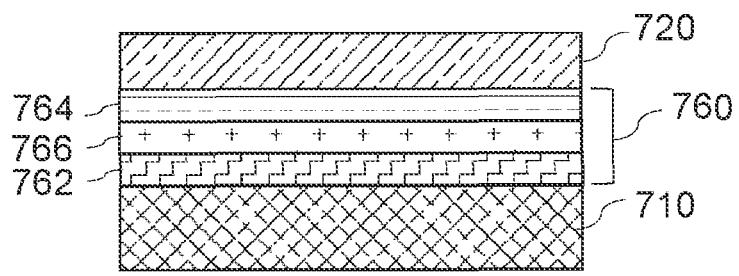
FIG. 7 illustrates a schematic view of a solid oxide fuel cell stack having a barrier layer with sublayers, in accordance with some embodiments of the disclosure.

FIG. 7 illustrates a portion 700 of the fuel cell stack 400 illustrated in FIG. 5. The portion 700 includes a metallic interconnect 710 and the glass seal 720. A barrier layer 760 such as the barrier 460 of the solid oxide fuel cell stack 400 is disposed between the metallic interconnect 710 and the glass seal 720. In one embodiment, the barrier layer 760 includes a first sublayer 762, a second sublayer 764, and a third sublayer 766. The third sublayer 766 is disposed between the first sublayer 762 and the second sublayer 764. In some embodiments, the first sublayer 762 includes a chromium phosphate, an iron phosphate, a silicon phosphate, a manganese phosphate, a titanium phosphate, nickel phosphate, or combinations thereof. The second sublayer 764 includes a barium phosphate, a silicon phosphate, a boron phosphate, a zirconium phosphate, a calcium phosphate, a magnesium phosphate, an yttrium phosphate, a zinc phosphate, or combinations thereof. The third sublayer 766 includes alumina and aluminum phosphate. In some embodiments, a thickness of the third sublayer 766 is greater than 5 microns. In some embodiments, a thickness of the third sublayer 766 is in a range from about 5.5 microns to about 50 microns.

Moreover, in some embodiments, reaction of the aluminum phosphate with chromium of the metallic interconnect 710 may form at least a part of the first sublayer 762. In a similar fashion, reaction of the aluminum-containing phosphate with barium of the glass seal 720 may form at least a part of the second sublayer 764. Also, the third sublayer 766 may be present as a barrier between the first sublayer 762 and the second sublayer 764. During further operation of the solid oxide fuel cell stack 400 shown in FIG. 5, chromium oxide scale on the surface of the metallic interconnect 710 may continue to grow. However, the third sublayer 766, especially alumina present in the third sublayer 766, may prevent or reduce a physical contact of chromium oxide with elements of the glass seal 720 such as barium, thereby preventing or reducing the reaction that might form barium chromate that may eventually degrade sealing between the electrolyte 530 and the metallic interconnect 412 during further operation of the solid oxide fuel cell stack 400.

In some embodiments, an operating temperature of the solid oxide fuel cell stack 400 shown in FIG. 5 may be in a range from about 600° C. to 850° C. Including the barrier layer 760 in between the metallic interconnect 710 and the glass seal 720 in a solid oxide fuel cell stack such as the solid oxide fuel cell stack 400 is advantageous in prolonging useful operational life of the solid oxide fuel cell stack 400. Further, the barrier layer in accordance with some embodiments of the disclosure, can be advantageously disposed at ambient conditions and a reacted barrier layer may be formed in-situ, by reacting aluminum-containing phosphate with the metallic interconnect and the glass seal, resulting in strong, reacted phosphate phases. The resultant reacted phosphate phases are stronger when compared to the presence of mere alumina between an interconnect and the glass seal that are conventionally formed using aluminizing techniques or by thermal spraying of alumina. Disposing the barrier layer disclosed in the embodiments of this disclosure is a fast and cost-effective method for prevention or reduction of chemical reaction between the metallic interconnect and the glass seal.

EXAMPLE

The following example is presented to further illustrate non-limiting embodiments of the present disclosure.

400 series stainless steel was used as an interconnect material for fabricating interconnect-supported solid oxide fuel cells. An anode and an electrolyte were disposed on the stainless steel by thermal spraying, and a cathode was disposed by thick film screen printing. An additional coating was disposed on the exposed stainless steel to prevent chromium volatilization during operation. Prior to assembling of the solid oxide fuel cells to form the stack, a non-active area of the cathode interconnect was prepared using a steel wire brush to adequately remove surface oxide. An aqueous slurry of aluminum dihydrogen phosphate (Al(H$_2$PO$_4$)$_3$) and alpha-alumina ($\alpha$-Al$_2$O$_3$) was prepared in 1:8 relative molar ratio and disposed over the stainless steel by aerosol deposition method. A glass paste was prepared using glass frits having silica, barium oxide, boron oxide, magnesium oxide, and calcium oxide as major (>10 mol % each) constituent elements; and yttria, zinc oxide, and zirconium oxide as minor (<3 mol %) constituent elements. The glass paste was screen printed over the disposed slurry and dried at 70° C. in air.

Figure 8:
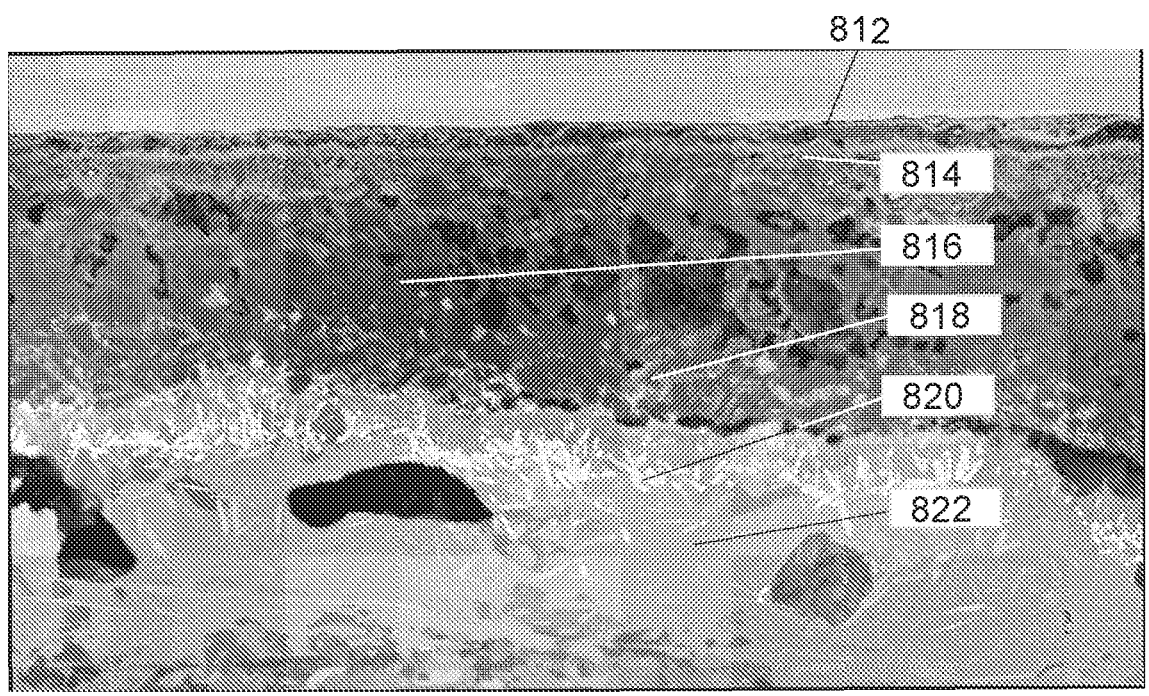
FIG. 8 illustrates a scanning electron micrograph of an interface of a stainless steel and glass seal in an example solid oxide fuel cell stack, in accordance with some embodiments of the disclosure.

A 10-cell stack was built by stacking cells with mica gaskets between each adjacent cell and heated to the operating temperature with the anode flow fields exposed to an inert nitrogen atmosphere. Once thermally soaked, fuel was introduced and the stack was operated at 0.24 A-cm$^{-2}$ for 500 hours and cooled to room temperature for characterization. FIG. 8 shows a scanning electron micrograph 800 of the reacted interface between the stainless steel and the glass seal. Table 1 below presents various represented regions in the scanning electron micrograph of FIG. 8 and the corresponding identified phases in the regions.

TABLE 1

Identification of various regions of the scanning electron micrograph illustrated in FIG. 8.

| Region | Phase 1 | Major non-oxide elements in Phase 1 | Phase 2 |
|---|---|---|---|
| 812 | Chromium oxide | Chromium | |
| 814 | 20 mol % phosphate | Phosphorous, aluminum, and chromium | Alumina |
| 816 | 8 mol % phosphate | Phosphorous and aluminum | Alumina |
| 818 | 9 mol % phosphate | Phosphorous, aluminum, silicon, and barium | Alumina |
| 820 | | Silicon, phosphorous and barium | |
| 822 | | Silicon | |

From Table 1, it can be analyzed that the barrier layer forms various sublayers that may be effectively hindering further reaction between elements of steel, such as for example, chromium and elements of the glass seal, such as for example, barium.

The article and the method disclosed herein are advantageous over the conventionally known articles and methods. As disclosed earlier, conventional methods of eliminating reaction between glass and stainless steel requires costly and slow aluminizing processes. The method described herein is comparatively fast and can be heated simultaneously with glass melting and subsequent stack sealing. The in-situ processing approach requires no additional high temperature processing step that is traditionally needed with aluminization.

This written description uses some examples to disclose the claimed disclosure, including the best mode, to enable any person skilled in the art to practice the disclosure, including making and using any devices or systems and performing any incorporated methods. The scope of the claimed disclosure may include other examples that occur to those skilled in the art. Such other examples are intended to be within the scope of the appended claims if they have structural elements that do not differ from the literal language of the claims, or if they include equivalent structural elements with insubstantial differences from the literal language of the claims.

The invention claimed is:

1. A solid oxide fuel cell stack comprising:
   at least two adjacent solid oxide fuel cells, each solid oxide fuel cell of the at least two adjacent solid oxide fuel cells comprising an anode, a cathode, and an electrolyte;
   a metallic interconnect disposed between the at least two adjacent solid oxide fuel cells;
   a glass seal disposed between the metallic interconnect and the electrolyte of at least one solid oxide fuel cell of the at least two adjacent solid oxide fuel cells; and
   a barrier layer disposed between the metallic interconnect and the glass seal and directly contacting the metallic interconnect, wherein the barrier layer comprises alumina and a phosphate, and wherein the phosphate comprises an aluminum dihydrogen phosphate, an aluminum-containing phosphate, a phosphate of an element of the metallic interconnect, a phosphate of an element of the glass seal, or combinations thereof,
   wherein the barrier layer and the glass seal are disposed in a non-active region of the metallic interconnect such that the barrier layer and the glass layer do not directly contact the anode and the cathode of either of the at least two adjacent solid oxide fuel cells.

2. The solid oxide fuel cell stack of claim 1, wherein the barrier layer comprises a first sublayer comprising a chromium phosphate, an iron phosphate, a silicon phosphate, a manganese phosphate, a titanium phosphate, a nickel phosphate or combinations thereof; a second sublayer comprising a barium phosphate, a silicon phosphate, a boron phosphate, a zirconium phosphate, a calcium phosphate, a magnesium phosphate, a yttrium phosphate, a zinc phosphate, or combinations thereof; and a third sublayer disposed between the first sublayer and the second sublayer, and wherein the third sublayer comprises alumina and an aluminum-containing phosphate.

3. The solid oxide fuel cell stack of claim 2, wherein a thickness of the third sublayer is greater than 5 microns.

4. The solid oxide fuel cell stack of claim 1, wherein the metallic interconnect is substantially free of aluminum.

5. The solid oxide fuel cell stack of claim 1, wherein the metallic interconnnect is arranged on a lower solid oxide fuel cell of the at least two adjacent solid oxide fuel cells and supports an upper solid oxide fuel cell of the at least two adjacent solid oxide fuel cells.

6. The solid oxide fuel cell stack of claim 5, wherein the metallic interconnect is arranged on an upper surface of the cathode of the lower solid oxide fuel cell.

7. The solid oxide fuel cell stack of claim 6, wherein the metallic interconnect includes a lower contact surface tht faces the cathode of the lower solid oxide fuel cell, and wherein the electrolyte of the lower solid oxide fuel cell extends beyond the cathode of the lower solid oxide fuel cell and includes an upper contact surface that faces the lower contact surface of the metallic interconnect.

8. The solid oxide fuel cell stack of claim 7, wherein a gap is defined between the upper contact surface of the electrolyte of the lower solid oxide fuel cell and the lower contact surface of the metallic interconnect, and wherein the glass seal and the barrier layer are arranged within the gap.

9. the solid oxide fuel cell stack of claim 1, wherein the total phosphate in the barrier layer is in a range from 1 mol % to 75 mol % of the barrier layer.

10. The solid oxide fuel cell stack of claim 1, wherein a mol % of the phosphate of the element of the metallic interconnect present in a first sublayer of the barrier layer is greater than a mol % of the aluminum-containing phosphate present in a third sublayer of the barrier layer disposed between the first sublayer and a second sublayer of the barrier layer.

11. A solid oxide fuel cell stack comprising:
at least two adjacent solid oxide fuel cells, each solid oxide fuel cell of the at least two adjacent solid oxide fuel cells comprising an anode, a cathode, and an eletrolyte;
a metallic interconnect disposed between the at least two adjacent solid oxide fuel cells, the metallic interconnect including a lower contact surface facing an upper contact surface of the electrolyte of an adjacent solid oxide fuel cell of the at least two adjacent solid oxide fuel cells, the metallic interconnect contacting the adjacent solid oxide fuel cell on the lower contact surface;
a glass seal disposed between the metallic interconnect and the electrolyte of the adjacent solid oxide fuel cell of the at least two adjacent solid oxide fuel cells, the galss seal disposed on the upper contact surface of the electrolyte; and
a barrier layer disposed between the metallic interconnect and the glass seal and directly contacting the lower contact surface of the metallic interconnect, wherein the barrier layer comprises alumina and a phosphate, and wherein the phosphate comprises an aluminum dihydrogen phosphate, an aluminum-containing phosphate, a phosphate of an element of the metallic interconnect, a phosphate of an element of the glass seal, or combinations thereof,
wherein the barrier layer and the glass seal are disposed in a non-active region of the metallic interconnect such that the barrier layer and the glass layer do not directly contact the anode and the cathode of either of the at least two adjacent solid oxide fuel cells.

12. The solid oxide fuel cell stack of claim 11, wherein the barrier layer comprises a first sublayer comprising a chromium phosphate, an iron phosphate, a silicon phosphate, a manganese phosphate, a titanium phosphate, a nickel phosphate or continations thereof; a second sublayer comprising a barium phosphate, a silicon phosphate, a boron phosphate, a zirconium phosphate, a calcium phosphate, a magnesium phosphate, a yttrium phosphate, a zinc phosphate, or combinations thereof; and a third sublayer disposed between the first sublayer and the second sublayer, and wherein the third sublayer comprises alumina and an aluminum-containing phosphate.

13. The solid oxide fuel cell stack of claim 12, wherein a thickness of the third sublayer is greater than 5 microns.

14. The solid oxide fuel cell stack of claim 11, wherein the metallic interconnect is substantially free of aluminum.

15. The solid oxide fuel cell stack of claim 11, wherein the metallic interconnect is arranged on a lower solid oxide fuel cell of the at least two adjacent solid oxide fuel cells and supports an upper solid oxide fuel cell of the at least two adjacent solid oxide fuel cells.

16. The solid oxide fuel cell stack of claim 15, wherein the metallic interconnect is arranged on an upper surface of the cathode of the lower solid oxide fuel cell.

17. The solid oxide fuel cell stack of claim 16, wherein the metallic interconnect includes a lower contact surface that faces the cathode of the lower solid oxide fuel cell, and wherein the electrolyte of the lower solid oxide fuel cell extends beyond the cathode of the lower solid oxide fuel cell and includes an upper contact surface that faces the lower contact surface of the metallic interconnect.

18. The solid oxide fuel cell stack of claim 17, wherein a gap is defined between the upper contact surface of the electrolyte of the lower solid oxide fuel cell and the lower contact surface of the metallic interconnect, and wherein the glass seal and the barrier layer are arranged within the gap.

19. The solid oxide fuel cell stack of claim 11, wherein a mol % of the phosphate of the element of the metallic interconnect present in a first sublayer of the barrier layer is greater than a mol % of the aluminum-containing phosphate present in a third sublayer of the barrier layer disposed between the first sublayer and a second sublayer of the barrier layer.

20. A method of fabricating a solid oxide fuel cell stack comprising:
stacking at least two solid oxide fuel cells to create at least two adjacent solid oxide fuel cells, each solid oxide fuel cell of the at least two adjacent solid oxide fuel cells comprising an anode, a cathode, and an electrolyte;
disposing a metallic interconnect between the at least two adjacent solid oxide fuel cells so as to support an upper solid oxide fuel cell of the at least two adjacent solid oxide fuel cells;
disposing a glass seal between the metallic interconnect and the electrolyte of a lower solid oxide fuel cell of the at least two adjacent solid oxide fuel cells; and
disposing a barrier layer between the metallic interconnect and the glass seal such that the barrier layer directly contacts the metallic interconnect, wherein the barrier layer comprises alumina and a phosphate, and wherein the phosphate comprises an aluminum dihydrogen phosphate, an aluminum-containing phosphate, a phosphate of an element of the metallic interconnect, a phosphate of an element of the glass seal, or combinations thereof,
wherein the barrier layer and the glass seal are disposed in a non-active region of the metallic interconnect such that the barrier layer and the glass layer do not directly contact the anode and the cathode of either of the at least two adjacent solid oxide fuel cells.

* * * * *